US008031361B2

(12) United States Patent
Taki et al.

(10) Patent No.: US 8,031,361 B2
(45) Date of Patent: Oct. 4, 2011

(54) IMAGE FORMING APPARATUS

(75) Inventors: Kazunari Taki, Nagoya (JP); Masashi Suzuki, Nagoya (JP); Hiroshi Koie, Nagoya (JP); Hideo Ueno, Nagoya (JP); Takahiro Ikeno, Seto (JP); Takahiro Hosokawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 974 days.

(21) Appl. No.: 11/853,386

(22) Filed: Sep. 11, 2007

(65) Prior Publication Data

US 2008/0068140 A1 Mar. 20, 2008

(30) Foreign Application Priority Data

Sep. 19, 2006 (JP) ................................. 2006-252991

(51) Int. Cl.
*H04N 1/04* (2006.01)

(52) U.S. Cl. ..................... 358/1.16; 358/1.14; 358/1.15; 358/1.11

(58) Field of Classification Search ................. 358/1.16, 358/1.14, 1.15, 1.11, 403, 404
See application file for complete search history.

(56) References Cited

U.S. PATENT DOCUMENTS 5,983,241 A 11/1999 Hoshino
6,409,401 B1 * 6/2002 Petteruti et al. ................. 400/88
6,477,528 B1 11/2002 Takayama
6,585,154 B1 7/2003 Ostrover et al.
6,691,918 B1 2/2004 Yoda et al.
6,827,279 B2 12/2004 Teraura
7,003,256 B2 2/2006 Kamakura et al.
7,061,634 B1 * 6/2006 Ogura et al. ................. 358/1.15
7,405,841 B2 7/2008 Takenouchi
7,428,067 B2 9/2008 Kiwada
7,450,253 B2 11/2008 Kiwada
7,728,992 B2 6/2010 Yamamoto et al.
7,731,435 B2 6/2010 Piersol et al.
2002/0049702 A1 4/2002 Aizikowitz et al.
2003/0053118 A1 3/2003 Muramoto (Continued)

FOREIGN PATENT DOCUMENTS

CN 1319821 A 10/2001

(Continued)

OTHER PUBLICATIONS

Technical Soft Inc,: http://www.softnet.com.jp/kaiteki/index.html; May 23, 2007.

(Continued)

*Primary Examiner* — Houshang Safaipour
(74) *Attorney, Agent, or Firm* — Banner & Witcoff, Ltd.

(57) ABSTRACT

An aspect of the invention provides an image forming apparatus including: a image forming section that forms an image based on a print data on at least one sheet equipped with a non-contact tag; a writing section that wirelessly writes a tag data into the non-contact tag of the at least one sheet; a first cassette that holds a plurality of sheets equipped with first type non-contact tags having a first storage capacity; a second cassette that holds a plurality of sheets equipped with second type non-contact tags having a second storage capacity larger than the first storage capacity; and a selecting section that selects a print cassette from among the first and second cassettes based on a data size of the tag data. The at least one sheet on which the image is formed by the image forming section is provided from the print cassette.

11 Claims, 10 Drawing Sheets

U.S. PATENT DOCUMENTS

| | | | | |
|---|---|---|---|---|
| 2003/0088557 | A1 | 5/2003 | Morino | |
| 2003/0223638 | A1 | 12/2003 | Jackson et al. | |
| 2004/0096123 | A1 | 5/2004 | Shih et al. | |
| 2004/0100381 | A1 | 5/2004 | Waters | |
| 2004/0141200 | A1 | 7/2004 | Minami et al. | |
| 2004/0184097 | A1 | 9/2004 | Suzuki | |
| 2005/0003839 | A1 | 1/2005 | Tripp | |
| 2005/0024393 | A1 | 2/2005 | Kondo et al. | |
| 2005/0029353 | A1 | 2/2005 | Isemura et al. | |
| 2005/0105724 | A1 | 5/2005 | Hull et al. | |
| 2005/0141003 | A1 | 6/2005 | Yamamoto et al. | |
| 2005/0141004 | A1 | 6/2005 | Kiwada | |
| 2005/0162699 | A1 | 7/2005 | Fukunaga et al. | |
| 2005/0171739 | A1 | 8/2005 | Squibbs et al. | |
| 2005/0172215 | A1 | 8/2005 | Squibbs et al. | |
| 2005/0175259 | A1 | 8/2005 | Takenouchi | |
| 2005/0200910 | A1 | 9/2005 | Kanoshima et al. | |
| 2006/0017950 | A1 | 1/2006 | Ikegami et al. | |
| 2006/0047999 | A1 | 3/2006 | Passerini et al. | |
| 2006/0051056 | A1 | 3/2006 | Furukawa | |
| 2006/0061814 | A1 | 3/2006 | Tokunaga | |
| 2006/0076399 | A1 | 4/2006 | Imine et al. | |
| 2006/0132816 | A1 | 6/2006 | Yamamoto et al. | |
| 2006/0164696 | A1* | 7/2006 | Kurohata et al. | 358/498 |
| 2006/0176511 | A1 | 8/2006 | Tagawa | |
| 2006/0248454 | A1 | 11/2006 | Giannetti | |
| 2007/0024901 | A1 | 2/2007 | Kayama | |
| 2007/0036599 | A1 | 2/2007 | Piersol et al. | |
| 2007/0146878 | A1 | 6/2007 | Liao | |
| 2007/0152058 | A1 | 7/2007 | Yeakley et al. | |
| 2007/0273525 | A1 | 11/2007 | Garber et al. | |
| 2008/0079994 | A1 | 4/2008 | Ueno et al. | |
| 2008/0098303 | A1 | 4/2008 | Murayama | |
| 2008/0151299 | A1 | 6/2008 | Takahata | |

FOREIGN PATENT DOCUMENTS

| | | | |
|---|---|---|---|
| EP | 0 944 238 | A1 | 9/1999 |
| JP | 62-171049 | A | 7/1987 |
| JP | 62-197840 | A | 9/1987 |
| JP | 63-065544 | A | 3/1988 |
| JP | 2-260045 | A | 10/1990 |
| JP | 3-4937 | B2 | 1/1991 |
| JP | 3-102438 | A | 4/1991 |
| JP | 5-113920 | A | 5/1993 |
| JP | 7-334397 | A | 12/1995 |
| JP | 8-202603 | A | 8/1996 |
| JP | 9-034763 | A | 2/1997 |
| JP | 2624170 | B2 | 4/1997 |
| JP | 10-294818 | A | 11/1998 |
| JP | 2000-020664 | | 1/2000 |
| JP | 3036977 | B2 | 4/2000 |
| JP | 2000-285203 | | 10/2000 |
| JP | 2001-043231 | A | 2/2001 |
| JP | 2001134723 | | 5/2001 |
| JP | 2001-180021 | A | 7/2001 |
| JP | 2002-149701 | A | 5/2002 |
| JP | 2002337426 | | 11/2002 |
| JP | 2003-242158 | A | 8/2003 |
| JP | 2003-263084 | A | 9/2003 |
| JP | 2003-320735 | | 11/2003 |
| JP | 2003-330769 | A | 11/2003 |
| JP | 2003-346086 | A | 12/2003 |
| JP | 2004-066692 | | 3/2004 |
| JP | 2004-094731 | A | 3/2004 |
| JP | 2004-094953 | | 3/2004 |
| JP | 2004-157588 | | 6/2004 |
| JP | 2004-181953 | A | 7/2004 |
| JP | 2004-222085 | | 8/2004 |
| JP | 2004-249499 | | 9/2004 |
| JP | 2004-265586 | A | 9/2004 |
| JP | 2004-287556 | | 10/2004 |
| JP | 2004-310293 | | 11/2004 |
| JP | 2004-310293 | A | 11/2004 |
| JP | 2004-314590 | A | 11/2004 |
| JP | 2004-322570 | | 11/2004 |
| JP | 2005022847 | | 1/2005 |
| JP | 2005-028673 | A | 2/2005 |
| JP | 2005-059577 | | 3/2005 |
| JP | 2005-101935 | | 4/2005 |
| JP | 2005-109681 | | 4/2005 |
| JP | 2005-117571 | | 4/2005 |
| JP | 2005-148240 | | 6/2005 |
| JP | 2005-149291 | A | 6/2005 |
| JP | 2005-151244 | A | 6/2005 |
| JP | 2005-165410 | A | 6/2005 |
| JP | 2005-174530 | | 6/2005 |
| JP | 2005-192080 | | 7/2005 |
| JP | 2005-196263 | | 7/2005 |
| JP | 2005-196840 | A | 7/2005 |
| JP | 2005-197831 | | 7/2005 |
| JP | 2005-197834 | | 7/2005 |
| JP | 2005-197835 | | 7/2005 |
| JP | 2005-202714 | A | 7/2005 |
| JP | 2005-212303 | | 8/2005 |
| JP | 2005-225100 | | 8/2005 |
| JP | 2005-229266 | | 8/2005 |
| JP | 2005-236740 | A | 9/2005 |
| JP | 2005-246680 | A | 9/2005 |
| JP | 2005242763 | | 9/2005 |
| JP | 2005-280046 | | 10/2005 |
| JP | 2005-285094 | | 10/2005 |
| JP | 2005-303422 | A | 10/2005 |
| JP | 2005-305662 | | 11/2005 |
| JP | 2005-327248 | | 11/2005 |
| JP | 2005313551 | | 11/2005 |
| JP | 2005-332042 | A | 12/2005 |
| JP | 2006-007674 | | 1/2006 |
| JP | 2006-011977 | | 1/2006 |
| JP | 2006-053671 | A | 2/2006 |
| JP | 2006-054777 | A | 2/2006 |
| JP | 2006027678 | | 2/2006 |
| JP | 2006-065912 | A | 3/2006 |
| JP | 2006-082490 | A | 3/2006 |
| JP | 2006-82940 | A | 3/2006 |
| JP | 2006-094037 | A | 4/2006 |
| JP | 2006-103284 | A | 4/2006 |
| JP | 2006-157439 | A | 6/2006 |
| JP | 2006-175647 | A | 7/2006 |
| JP | 2006-175813 | A | 7/2006 |
| JP | 2006-181807 | A | 7/2006 |
| JP | 2006-197324 | A | 7/2006 |
| JP | 2006-218773 | A | 8/2006 |
| JP | 2006-229670 | A | 8/2006 |
| JP | 2006-252045 | A | 9/2006 |
| JP | 2008-511084 | T | 4/2008 |
| JP | 2001-077959 | A | 10/2009 |
| WO | 2006/023992 | A2 | 3/2006 |
| WO | 2006-064781 | A1 | 6/2006 |

OTHER PUBLICATIONS

Kinokuniya BookWeb; May 23, 2007.
Co-Pending U.S. Appl. No. 11/860,259, filed Sep. 24, 2007.
Co-Pending U.S. Appl. No. 11/858,456, filed Sep. 20, 2007.
Co-Pending U.S. Appl. No. 11/857,803, filed Sep. 19, 2007.
Co-Pending U.S. Appl. No. 11/859,011, filed Sep. 21, 2007.
Co-Pending U.S. Appl. No. 11/861,617, filed Sep. 26, 2007.
Co-Pending U.S. Appl. No. 11/859,481, filed Sep. 21, 2007.
Co-Pending U.S. Appl. No. 11/860,067, filed Sep. 24, 2007.
Co-Pending U.S. Appl. No. 11/860,163, filed Sep. 27, 2007.
Co-Pending U.S. Appl. No. 11/862,246, filed Sep. 27, 2007.
JP Office Action dtd Oct. 28, 2008, JP Appln. 2006-265321 (partial translation provided).
JP Office Action dtd Oct. 28, 2008, JP Appln. 2006-262750.
JP Office Action dtd Oct. 14, 2008, JP Appln. 2006-252991.
JP Office Action dtd Oct. 14, 2008, JP Appln. 2006-252990 (partial translation provided).
JP Office Action dtd Oct. 21, 2008, JP Appln. 2006-265322 (partial translation provided).
JP Office Action dtd Aug. 26, 2008, JP Appln. 2006-259117.
JP Office Action dtd Aug. 5, 2008, JP Appln. 2006-257295.
JP Office Action dated Jul. 14, 2009, JP Appln 2006-265321, partial English translation.
Non-Final Office Action dated Mar. 7, 2011 in U.S. Appl. No. 11/857,803.

Non-Final Office Action dated Mar. 2, 2011 in U.S. Appl. No. 11/858,456.
Non-Final Office Action dated Feb. 18, 2011 in U.S. Appl. No. 11/862,246.
JP Office Action dtd Jan. 20, 2009, JP Appln. 2006-259138.
Non-Final Office Action dated Mar. 21, 2011 in U.S. Appl. No. 11/861,617.
Non-Final Office Action dated Mar. 22, 2011 in U.S. Appl. No. 11/859,481.
Non-Final Office Action dated Apr. 5, 2011 in U.S. Appl. No. 11/860,067.
EP Search Report dtd Mar. 10, 2008, EP App 07253797-0.
CN Office Action dtd May 8, 2009, CN Appln. 200710154195.5, partial English translation.
CN Office Action dtd May 22, 2009, CN Appln. 2007101525327, English translation.
Extended EP Search Report dtd Jul. 2, 2009, EP Appln. 07253683.2.
JP Office Action dtd May 20, 2008, JP Appln. 2006-265320.
JP Office Action dtd May 27, 2008, JP Appln. 2006-259138 (no English translation provided).
JP Office Action dtd Jul. 14, 2009, JP Appln. 2006-265321, partial English Translation.
Notification of Reasons for Refusal dispatched Aug. 17, 2010 in Japanese Application No. 2008-188246 and English Translation thereof.
Non-Final Office Action dated Nov. 10, 2010 in U.S. Appl. No. 11/860,067.
Final Office Action dated Aug. 3, 2011 in U.S. Appl. No. 11/862,246.
Final Office Action dated Aug. 12, 2011 in U.S. Appl. No. 11/857,803.
Final Office Action dated Aug. 17, 2011 in U.S. Appl. No. 11/858,456.
Non-Final Office Action dated Jun. 28, 2011 in U.S. Appl. No. 11/860,163.
Non-Final Office Action dated Jun. 22, 2011 in U.S. Appl. No. 11/859,011.

* cited by examiner

IMAGE FORMING APPARATUS

CROSS-REFERENCE TO RELATED APPLICATION

This application claims priority from Japanese Patent Application No. 2006-252991, filed on Sep. 19, 2006, the entire subject matter of which is incorporated herein by reference.

TECHNICAL FIELD

Aspects of the present invention relates to an image forming apparatus which forms an image on a sheet equipped with a non-contact tag. The non-contact tag wirelessly transmits and receives a tag data and stores the tag data therein.

BACKGROUND

JP-A-2002-337426 discloses an image forming apparatus which forms an image on a sheet equipped with a non-contact tag. The non-contact tag wirelessly transmits and receives a tag data and stores the tag data therein. This image forming apparatus includes a cassette which holds sheets equipped with the non-contact tags and another cassette which stacks sheets not equipped with the non-contact tags. When a given data includes tag data to be written into a non-contact tag, the cassette holding the sheets equipped with the non-contact tags is selected, and an image is formed on the sheet. Further, the tag data are written into the non-contact tag.

JP-A-2005-313551 discloses an image forming apparatus having a plurality of cassettes respectively holding sheets of different sizes. The image forming apparatus includes a reader which establishes communication with a non-contact tag provided in a sheet, before the sheet fed from any of the plurality of cassettes reaches a registration position. In accordance with a print mode data acquired from the non-contact tag provided in the sheet, a print mode, such as a fixing temperature optimum for sheet quality or sheet thickness, is set, to thus perform printing. This image forming apparatus is provided with a plurality of readers with different communication frequencies or a reader which establishes communication by switching communication frequencies, to thus enable communication with a non-contact tag of different frequency.

SUMMARY

In the image forming apparatus as disclosed in JP-A-2002-337426, when the tag data is stored in the non-contact tag, the cassette holding sheets equipped with non-contact tags is selected. When no data is to be stored, the cassette holding sheets having no non-contact tags is selected. When the amount of storage capacity required for a tag data to be stored is larger, the storage capacity of the non-contact tag could be deficient. In such a case, in order to store the whole tag data, the tag data has to be stored in non-contact tags of blank sheets, which raises a problem of an increase in the number of sheets.

In the image forming apparatus as discloses in JP-A-2005-313551, sheets equipped with non-contact tags of different communication frequencies can be used. A sheet suitable for an image to be printed can be selected from sheets of different sizes. However, similar to the image forming apparatus of JP-A-2002-337426, when the storage capacity required for a tag data to be stored is larger, the tag data has to be stored in non-contact tags of blank sheets, which raises a problem of an increase in the number of sheets.

Aspects of the present invention relate to the above problem. According to at least one aspect of the invention, an image forming apparatus may be provide that appropriately select one cassette according to the amount of tag data to be stored in the tag.

An aspect of the present invention provides an image forming apparatus including: a image forming section that forms an image based on a print data on at least one sheet equipped with a non-contact tag; a writing section that wirelessly writes a tag data into the non-contact tag of the at least one sheet; a first cassette that holds a plurality of sheets equipped with first type non-contact tags having a first storage capacity; a second cassette that holds a plurality of sheets equipped with second type non-contact tags having a second storage capacity larger than the first storage capacity; and a selecting section that selects a print cassette from among the first and second cassettes based on a data size of the tag data. The at least one sheet on which the image is formed by the image forming section is provided from the print cassette.

DETAILED DESCRIPTION

One illustrative embodiment according to the present invention will be described with reference to the drawings.

Figure 1:
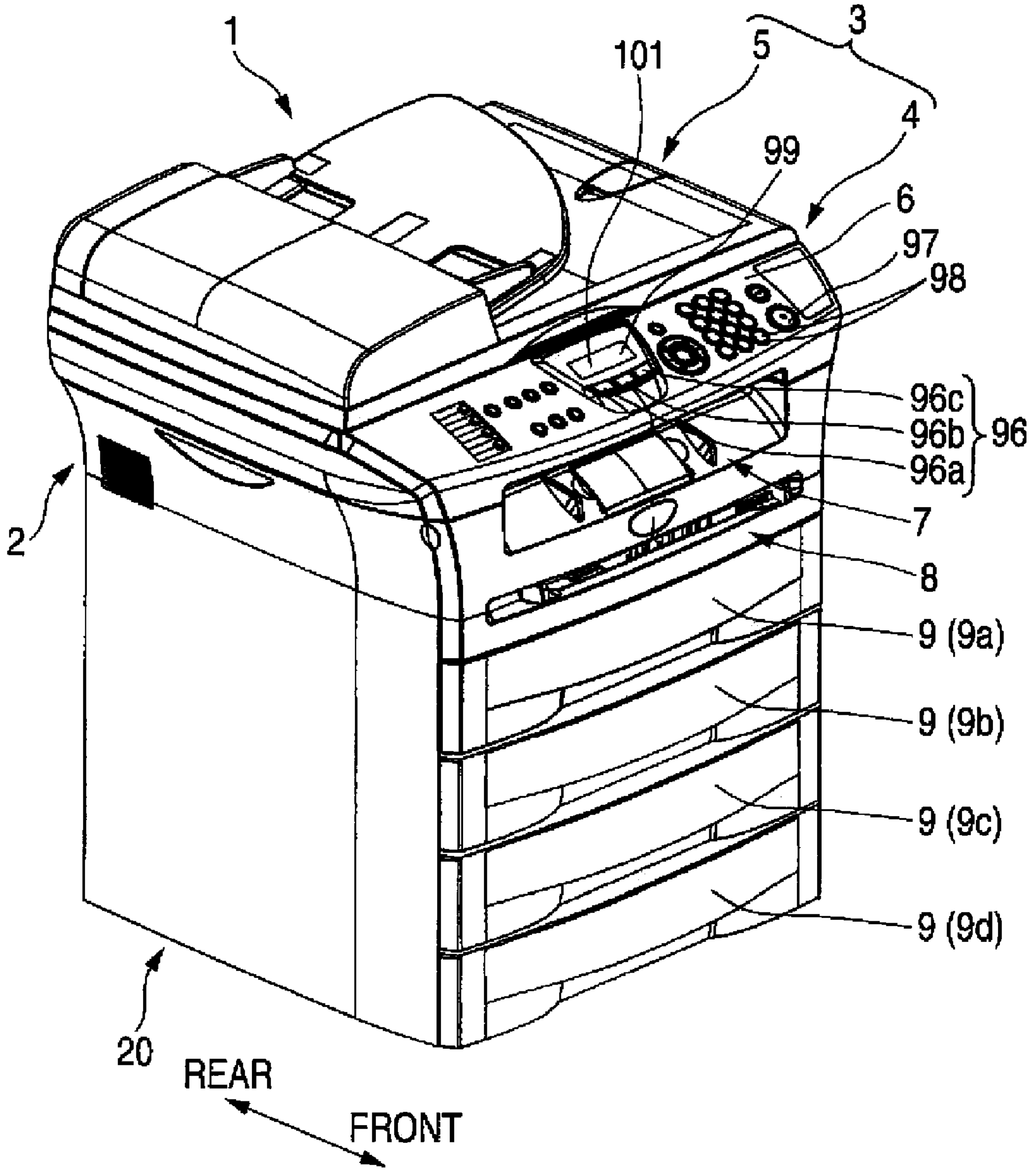
FIG. 1 is a perspective view showing the appearance of a multifunction apparatus according to an embodiment of the present invention.
Figure 2:
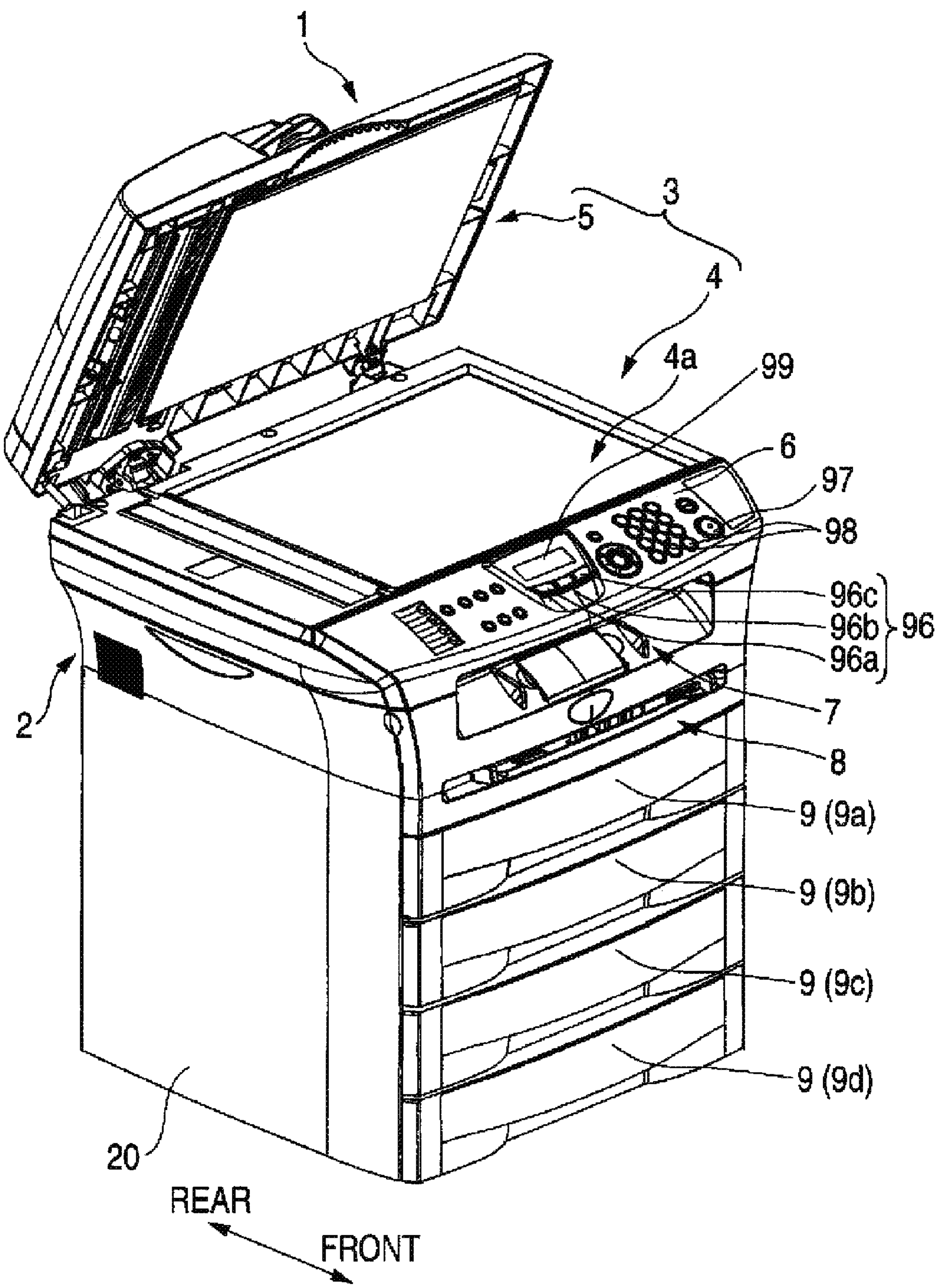
FIG. 2 is a perspective view of the multifunction apparatus with a reading unit according to the embodiment being opened.

A multifunction apparatus 1 serves as an image forming apparatus according to the embodiment of the present invention has a printer function, a scanner function, and a copier function. FIG. 1 is a perspective view showing the appearance of the multifunction apparatus. FIG. 2 is a perspective view of the multifunction apparatus 1 with a reading unit 3 being opened. In the following descriptions, the direction of a surface side of the multifunction apparatus 1 including an operation section 6 (a lower right direction in a drawing sheet of FIG. 1) is taken as the "front"; and the direction of an opposite side of the multifunction apparatus 1 (an upper left direction in the drawing sheet of FIG. 1) is taken as the "rear".

The detailed configuration of this type of multifunction apparatus is described in, for example, US Patent Application Publication No. 2007/0133039 A1 and the entire subject matter of which is incorporated herein by reference. This multifunction apparatus 1 includes: an image forming unit 2 accommodating a sheet feeder 21, an image forming section 22, and others (see FIG. 3); and an automatic conveyed-document reading unit 3 (hereinafter refer to as image reading unit 3). As shown in FIGS. 1 and 2, the image reading unit 3 includes an image reading device 4 having a rectangular document table 4*a*, and an automatic document feeder (hereinafter referred to as ADF 5).

The operation section 6 includes a mode selection switch 96, a start key 97, various operation buttons 98, and a liquid-crystal display touch panel 99 including a display section 101.

The mode selection switch 96 includes a copy mode key 96*a*, a FAX mode key 96*b*, and a scanner mode key 96*c*.

Figure 3:
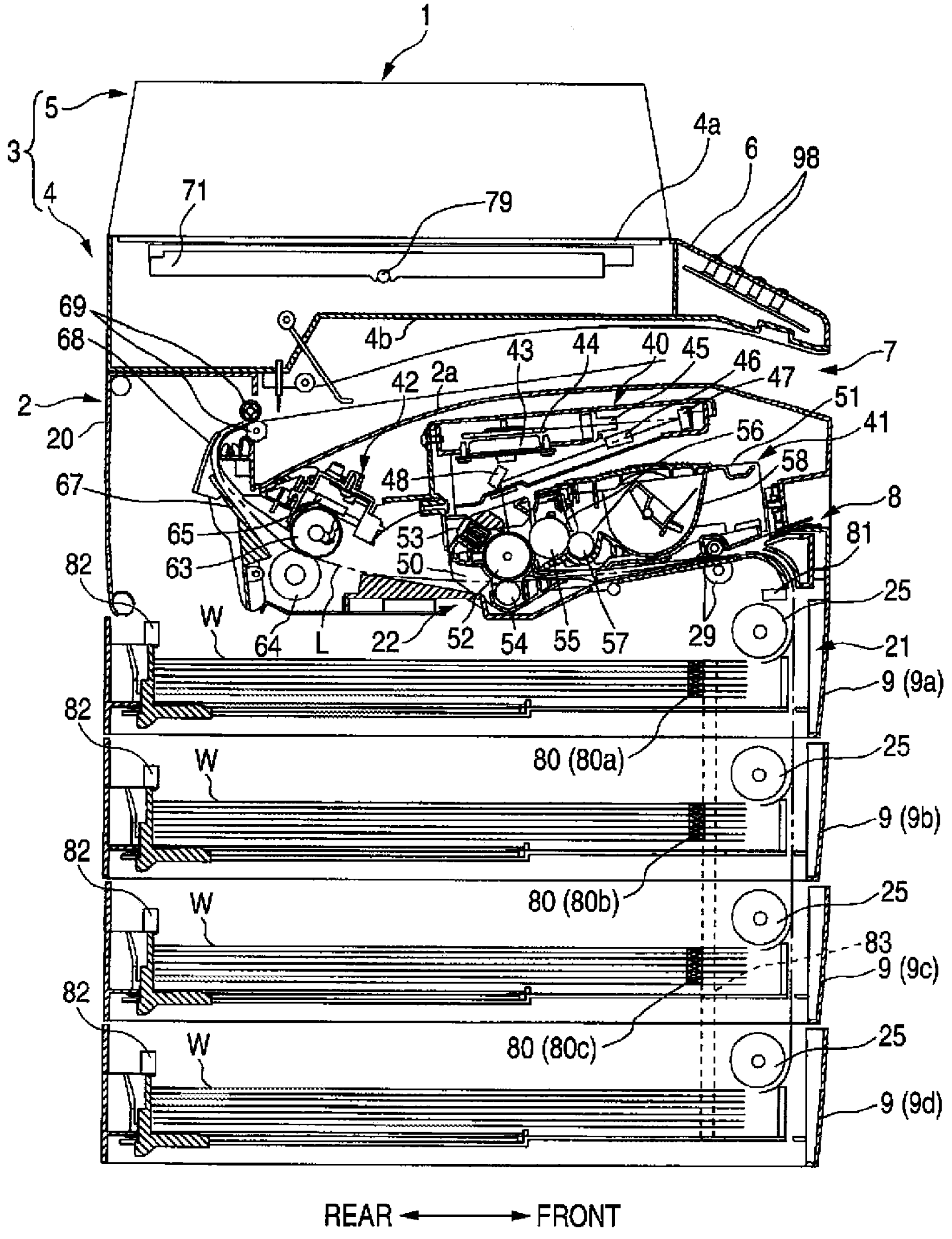
FIG. 3 is a side cross-sectional view of the multifunction apparatus of the embodiment when viewed from an axial direction of a feed roller.

A sheet ejection space 7 is defined below the operation section 6 and opened in communication with a sheet discharging tray 2*a* (FIG. 3: the tray will be described later). A manual sheet feeding port 8 is defined below the sheet ejection space 7. Four sheet feeding cassettes 9 (9*a*, 9*b*, 9*c*, and 9*d*) are provided further below the manual sheet feeding port 8.

The configuration of respective sections of the image forming unit 2 will be described with reference to FIG. 3. FIG. 3 is a side cross-sectional view of the multifunction apparatus 1 when viewed from the axial direction of a feed roller 25. The right side of FIG. 3 corresponds to the front of the multifunction apparatus 1, and the left side of the FIG. 3 corresponds to the rear of the multifunction apparatus 1.

The casing 20 of the image forming unit 2 accommodates the sheet feeder 21 which feeds sheets W and the image forming section 22.

The sheet feeder 21 includes the sheet feeding cassettes 9 (9*a*, 9*b*, 9*c*, and 9*d*); a sheet pressing plate (omitted from the drawings); the feed rollers 25.

The sheets W are loaded in the sheet feeding cassette 9 in a stacked manner. The feed roller 25 sequentially feeds the uppermost sheet W toward a registration roller 29 along a conveyance path L.

In the present embodiment, the sheet feeding cassettes 9 (9*a*, 9*b* and 9*c*) are capable of holding the sheets W, each of which is equipped with non-contact tags 80 (Radio Frequency Identification (RFID) tags) (80*a*, 80*b*, and 80*c*) that store a data (described later) and that transmits and receives radio waves by an antenna (not shown).

For instance, each of the non-contact tags 80 (80*a*, 80*b*, and 80*c*) is embedded in a portion of margins of a rectangular sheet W (an area close to an upper right end which becomes a margin at the time of printing; an angular portion (one of four corners) of the sheet W may also be acceptable). The surface of the sheet W can be subjected to printing as is the case with a normal sheet.

When the non-contact tags 80 (80*a*, 80*b*, and 80*c*) differ from each other in terms of an operation frequency, they also differ from each other in terms of a communication range. For instance, when a non-contact tag has an operation frequency of 900 MHz and another non-contact tag has an operation frequency of 13.56 GHz, the non-contact tag of 900 MHz has a longer communication range, and the non-contact tag of 13.56 GHz has a shorter communication range.

The present embodiment employs three types of non-contact tags 80 (80*a*, 80*b*, and 80*c*). The non-contact tag 80*a* has a long communication range and small storage capacity; the non-contact tag 80*b* has a short communication range and large storage capacity; and the non-contact tag 80*c* has a short communication range and small storage capacity.

In the present embodiment, the uppermost sheet feeding cassette 9*a* holds sheets W, each of which is equipped with the non-contact tag 80*a* having a long communication range and small storage capacity. The second sheet feeding cassette 9*b* holds sheets W, each of which is equipped with the non-contact tag 80*b* having a short communication range and large storage capacity. The third sheet feeding cassette 9*c* holds sheets W, each of which equipped with the non-contact tag 80*c* having a short communication range and small storage capacity. The lowermost sheet feeding cassette 9*d* holds sheets W not having any non-contact tags 80. The present invention is not limited to the case where the sheet feeding cassette 9*d* holds sheets not having non-contact tags. The sheet feeding cassette 9*d* may hold sheets having non-contact tags.

An insertion-removal detection section 82 which detects insertion and removal of the sheet feeding cassettes 9 (9*a*, 9*b*, 9*c*, and 9*d*) and is disposed on either side of the rear end of each of the sheet feeding cassettes 9 (9*a*, 9*b*, 9*c*, and 9*d*) while being inserted to the casing 20. The insertion-removal detection section 82 includes, for example, a photoelectronic sensor consisting of a pair of elements; i.e., a light-emitting element (not shown) and a light-receiving element (not shown) for receiving light from the light-emitting element which are disposed on both sides of the respective sheet feeding cassettes 9 (9*a*, 9*b*, 9*c*, and 9*d*). When the sheet feeding cassettes 9 (9*a*, 9*b*, 9*c*, and 9*d*) are inserted to the casing 20, sidewalls of the respective sheet feeding cassettes 9 (9*a*, 9*b*, 9*c*, and 9*d*) block the light from the light-emitting element. As a result of removal of the sheet feeding cassettes 9 (9*a*, 9*b*, 9*c*, and 9*d*), the light from the light-emitting element is received by the light-receiving element.

Figure 4:
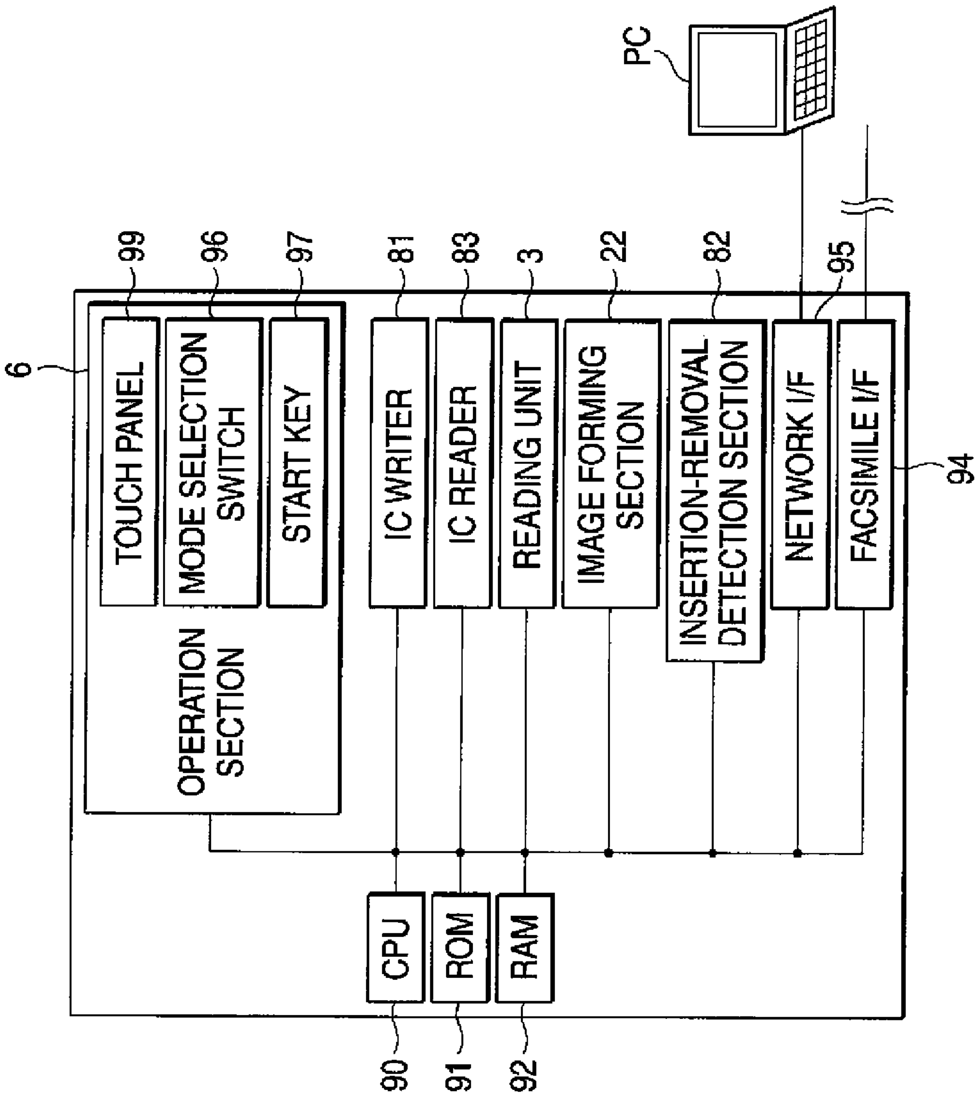
FIG. 4 is a block diagram showing an electrical system of the multifunction apparatus according to the embodiment.

The change in the amount of the light received by the light-receiving elements as a signal is output to a CPU 90 shown in FIG. 4, thereby the CPU 90 can detect that insertion or removal of the sheet feeding cassettes 9 (9*a*, 9*b*, 9*c*, and 9*d*) has been performed.

The registration roller 29 includes a pair of rollers. In accordance with a detection timing of a position sensor (not shown) disposed nearby, activation and deactivation of the registration roller 29 are controlled. The operation of registration roller 29 corrects skew of the sheet W.

An IC writer 81 serving as a writing section, which opposes the non-contact tag 80 (80*a*, 80*b*, or 80*c*) of the sheet W sent by any of the feed rollers 25 is disposed between the sheet feed rollers 25 and the registration roller 29. The IC writer 81 can wirelessly store (write) a tag data into the non-contact tag 80 of the sheet W by transmitting radio waves from an antenna (not shown). The IC writer 8 can store tag data even into the non-contact tag 80 (80*a*, 80*b*, or 80*c*) of different operation frequency, by switching among a plurality of antennas (not shown). The present invention is not limited to the case where the antennas are switched, and a plurality of IC writers 81 for different operation frequencies may also be provided.

An IC reader 83 serving as a detector is disposed on the side of the four sheet feeding cassettes 9 (9*a*, 9*b*, 9*c*, and 9*d*) to a height corresponding to the entirety of the vertically-stacked four sheet feeding cassettes 9 (9*a*, 9*b*, 9*c*, and 9*d*). By radio-communicating with the non-contact tags 80 (80*a*, 80*b*, and 80*c*) of the respective sheet feeding cassettes 9 (9*a*, 9*b*, 9*c*, and 9*d*), the IC reader 83 switches among a plurality of antennas (not shown), to thus detect operation frequencies of the respective contact tags 80 (80*a*, 80*b*, and 80*c*). The non-contact tags 80 (80*a*, 80*b*, and 80*c*) stores a data or the like in advance. Storage capacity of each of the non-contact tags 80 (80*a*, 80*b*, and 80*c*) is detected from the data, or the like to determine the types of the respective non-contact tags 80 (80*a*, 80*b*, and 80*c*). The present invention is not limited to the case where the antennas are switched, IC readers 83 for different operation frequencies may also be provided for respective sheet feeding cassettes.

The image forming section 22 includes a scanner unit 40, a process unit 41, and a fixing unit 42. The scanner unit 40 includes a laser emission section (not shown), a polygon mirror 44 rotationally driven by a polygon motor 43, lenses 45, 46, and reflection mirrors 47, 48. The process unit 41 includes a drum cartridge 50 and a developing cartridge 51.

The drum cartridge 50 includes the photosensitive drum 52, a scorotoron-type electrification device 53 for positive electrification, and a transfer roller 54. The developing cartridge 51 includes a developing roller 55, a layer thickness regulation blade 56, a toner feed roller 57, and a toner box 58 filled with toner (a developing agent).

As the photosensitive drum 52 rotates, the surface of the photosensitive drum 52 is uniformly electrified with positive charges by the scorotoron-type electrification device 53. The photosensitive drum 52 is exposed to a high-speed scan of a laser beam from the scanner unit 40, whereby an electrostatic latent image is formed based on a print image data.

When the positively-charged toner held on the developing roller 55 faces and comes into contact with the photosensitive drum 52 as the developing roller 55 rotates, the toner is supplied to the electrostatic latent image created on the surface of the photosensitive drum 52.

A visible image held on the surface of the photosensitive drum 52 is transferred onto the sheet W in the process of the sheet W passing between the photosensitive drum 52 and the transfer roller 54.

The fixing unit 42 includes a heating roller 63, a pressing roller 64, and a thermistor 65.

The reading unit 3 includes the image reading device 4 and the ADF 5.

The image reading device 4 includes a CIS (contact image sensor) 71 is moved along a shaft 79.

FIG. 4 is a block diagram showing an electrical system of the multifunction apparatus 1 of the present embodiment. As shown in FIG. 4, the multifunction apparatus 1 includes the operation section 6 which receives various input operations; the insertion-removal section 82 for detecting insertion and removal of the sheet feeding cassettes 9; the IC writer 81 which stores tag data into the non-contact tags 80 (80*a*, 80*b*, and 80*c*); the IC reader 83 which reads the tag data from the non-contact tags 80 (80*a*, 80*b*, and 80*c*); the reading unit 3 which reads an image; the image forming section 22 which performs printing operation and which also performs thermal fixing operations by the fixing unit 42; ROM 91; RAM 92; the CPU 90; a facsimile interface 94 connected to a communications line, such as a telephone line; and a network interface 95 connected to a personal computer (hereinafter referred to as PC).

Upon receiving a print data from an external PC or an image data from the image reading unit 3 as a result of performing a scanning operation for copying, the print data, the image data, and information (e.g., information about a user who has issued a print command or page information about the number of pages requested to be printed) attached to the data are stored into the RAM 92.

Figure 5:
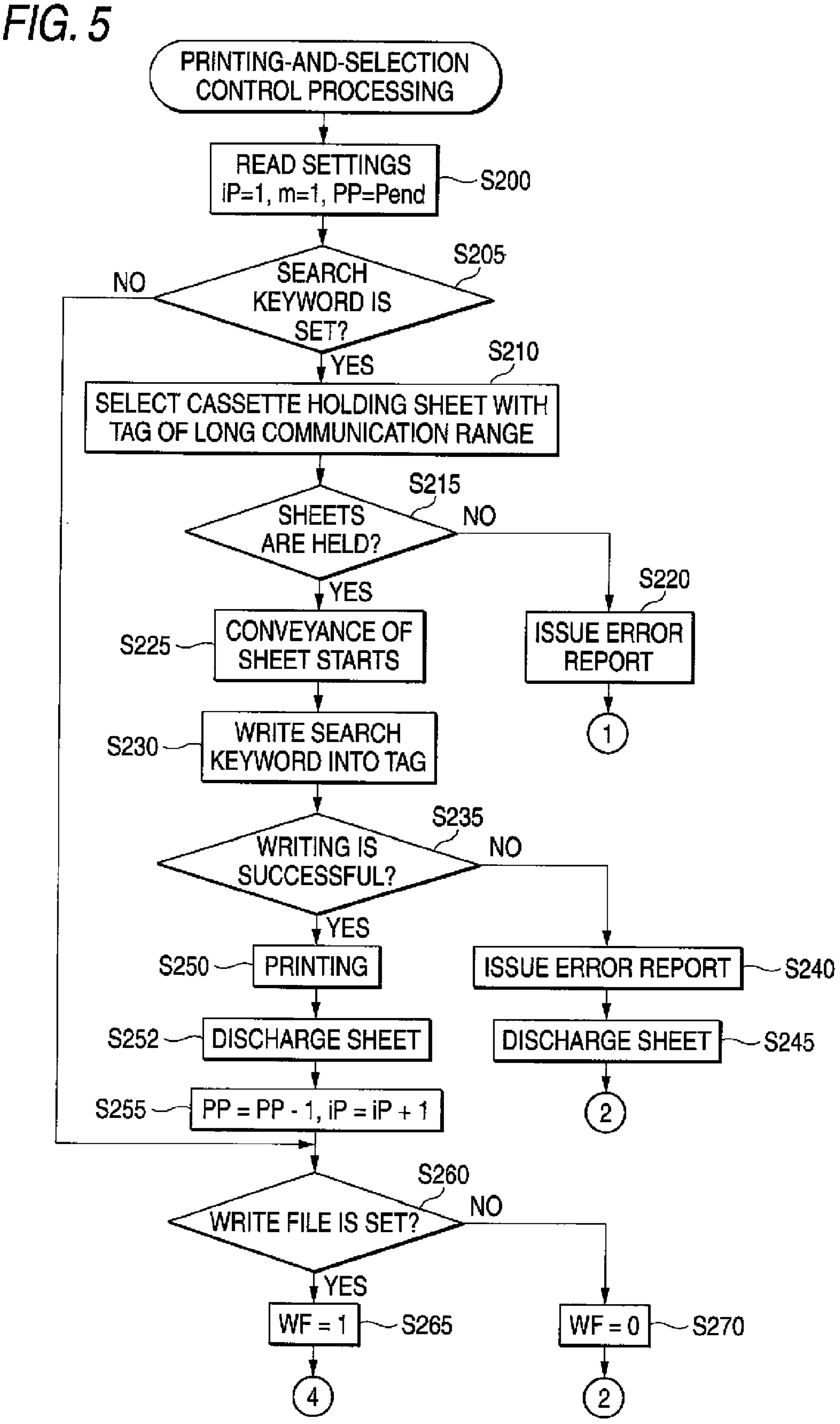
FIG. 5 is a flowchart showing an exemplary first part of a printing-and-selection control processing performed by the multifunction apparatus according to the embodiment.
Figure 6:
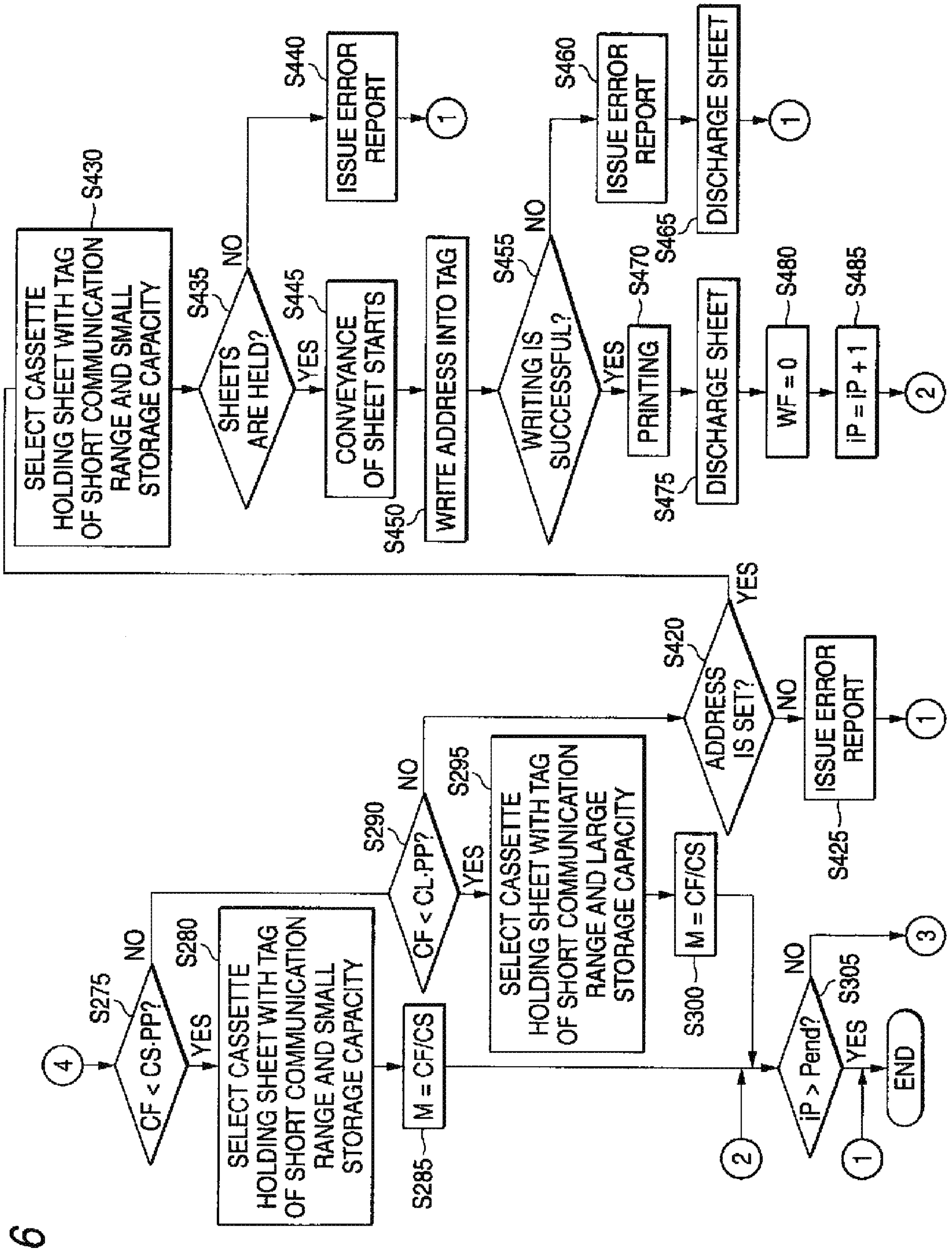
FIG. 6 is a flowchart showing an exemplary middle part of the printing-and-selection control processing performed by the multifunction apparatus according to the embodiment.
Figure 7:
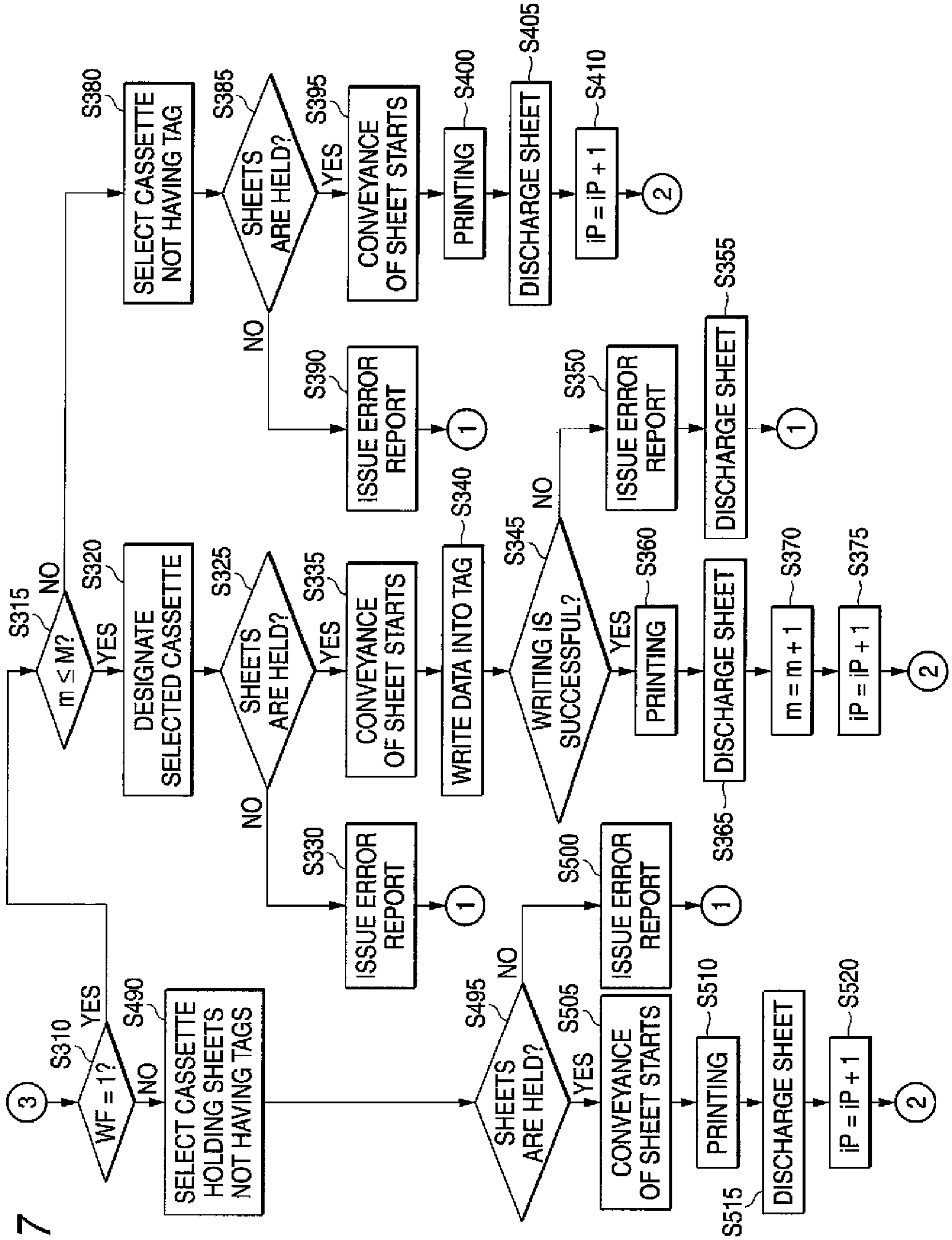
FIG. 7 is a flowchart showing an exemplary end part of the printing-and-selection control processing performed by the multifunction apparatus according to the embodiment.
Figure 8:
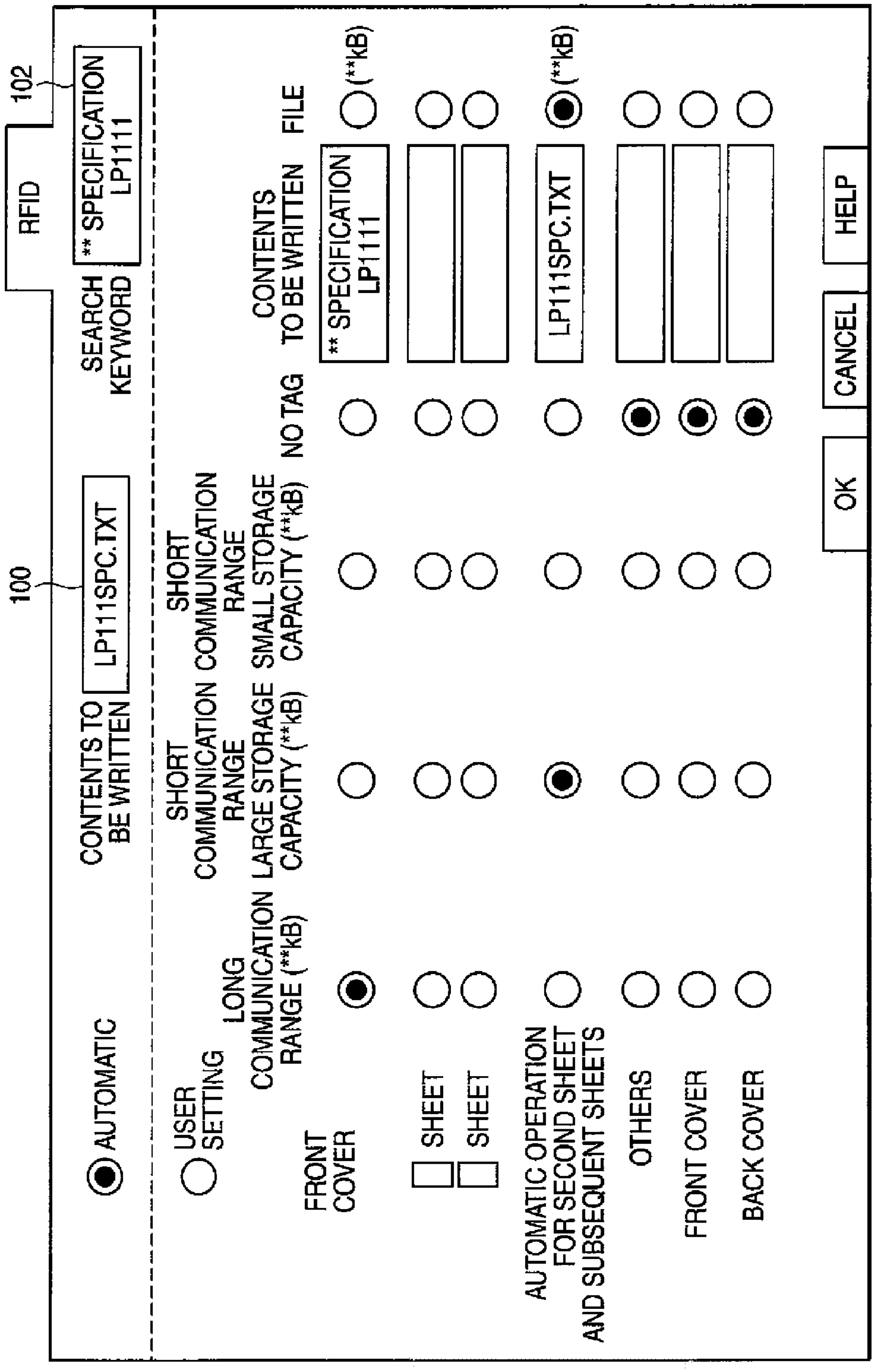
FIG. 8 is a descriptive view of a screen for setting contents to be written and a search keyword according to the embodiment.
Figure 9:
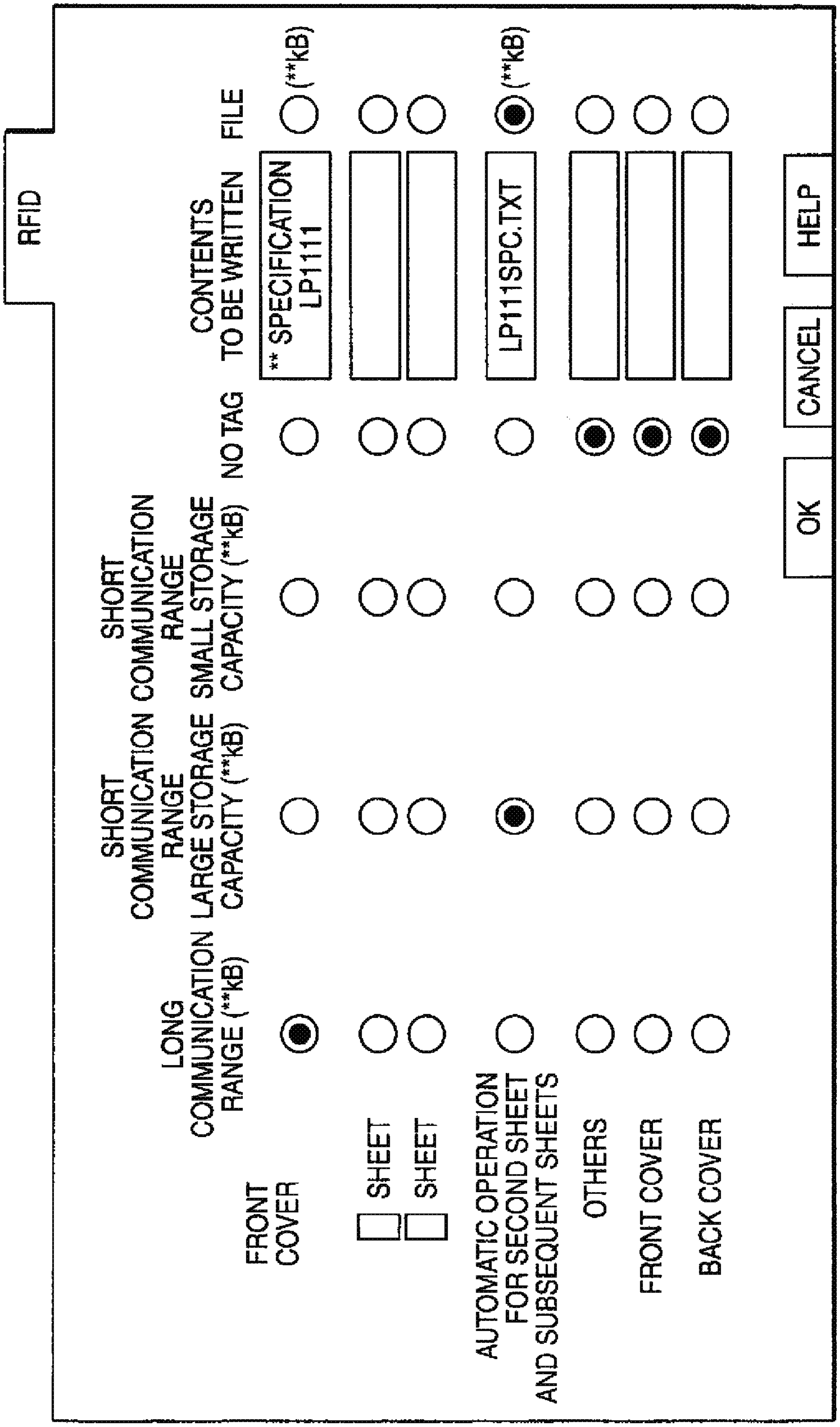
FIG. 9 is a descriptive view of a screen after setting of the contents to be written and the search keyword according to the embodiment.

The multifunction apparatus performs a printing-and-selection control processing (selecting section) which will now be described. FIGS. 5 through 7 are flowcharts showing an example of printing-and-selection control processing performed by the multifunction apparatus 1 according to the present embodiment. Portions of the processing may be performed by the PC, and results of processing may also be transmitted to the multifunction apparatus 1. Alternatively, the PC may also perform the printing-and-selection control processing, thereby controlling the multifunction apparatus 1.

First, before performing the printing-and-selection control processing, the IC reader 83 detects the types of the non-contact tags 80 (80*a*, 80*b*, and 80*c*) of the sheets W held in the respective sheet feeding cassettes 9 (9*a*, 9*b*, 9*c*, and 9*d*). The detected types are stored in RAM 92. In the present embodiment, the following are detected and stored in RAM 92: the sheets W equipped with the non-contact tags 80*a*, each of which has a long communication range and small storage capacity, are held in the uppermost sheet feeding cassette 9*a*; the sheets W equipped with the non-contact tags 80*b*, each of which has a short communication range and large storage capacity, are held in the second sheet feeding cassette 9*b*; the sheets W equipped with the non-contact tags 80*c*, each of which has a short communication range and small capacity, are held in the third sheet feeding cassette 9*c*; and the sheets W not having the non-contact tags 80 are held in the lowermost sheet feeding cassette 9*d*.

The present embodiment is not limited to the case where the type of the non-contact tag is detected by the IC reader 83. The non-contact tags 80 (80*a*, 80*b*, and 80*c*) of the sheets W held in the respective sheet feeding cassettes 9 (9*a*, 9*b*, 9*c*, and 9*d*) may be set by operations through the operation section 6 of the multifunction apparatus 1 in consideration of contents displayed on the display section 101 or by operations through the PC.

Figure 10:
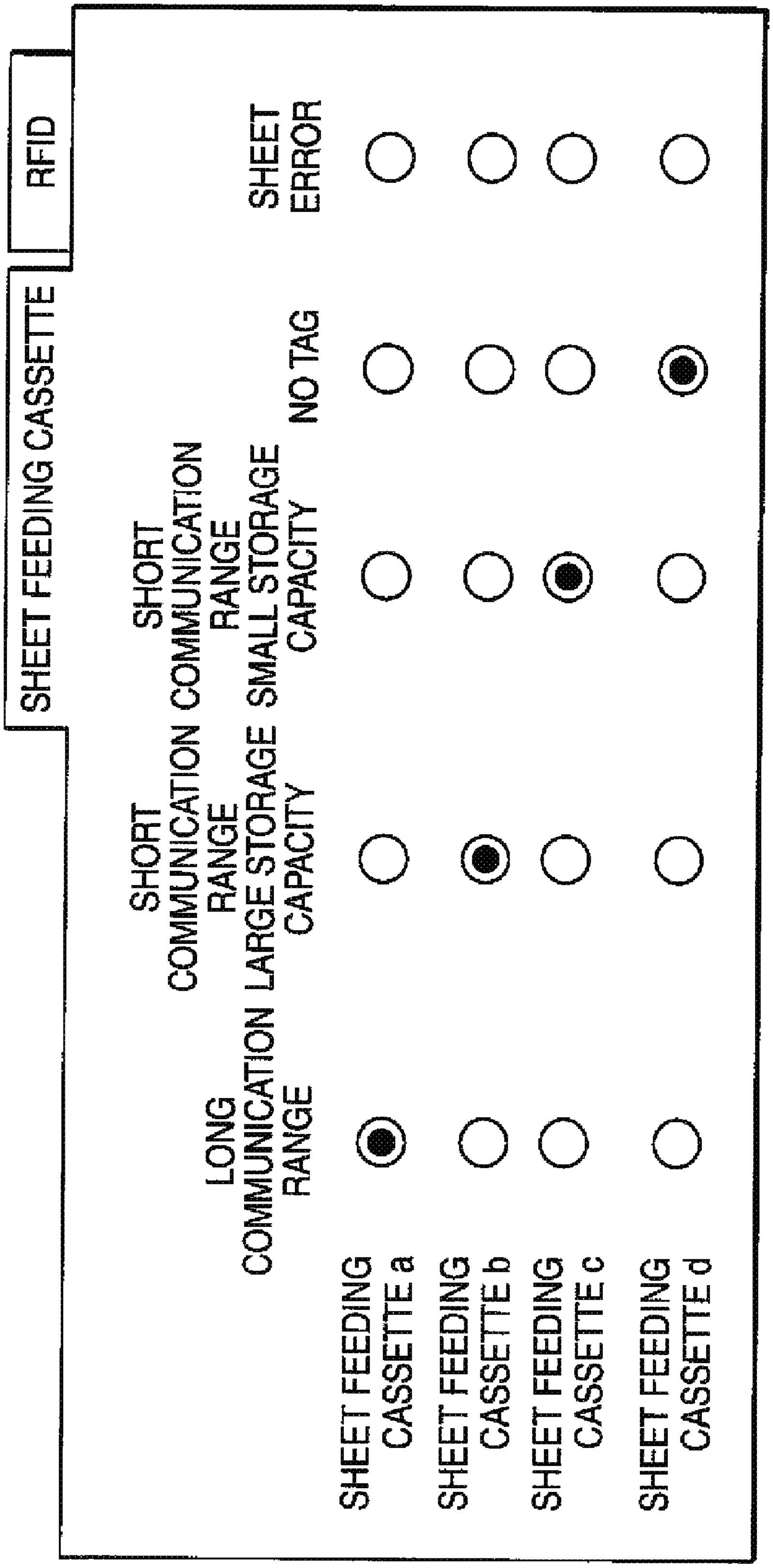
FIG. 10 is a descriptive view showing a screen for setting the types of non-contact tags displayed on a display section, or the like, according to the embodiment.

FIG. 10 is a descriptive view showing a setting screen displayed on the display section 101, or the like. As shown in FIG. 10, the types of the non-contact tags 80 (80*a*, 80*b*, and 80*c*) held in the respective sheet feeding cassettes 9 (9*a*, 9*b*, 9*c*, and 9*d*) and the absence of a non-contact tag may be set by putting a checkmark in checkboxes. The non-contact tags 80 (80*a*, 80*b*, and 80*c*) may be detected by the IC reader 83, or the like. When the settings and a result of detection performed by the IC reader 83 are different, sheet error information may be displayed.

The name of a file to be printed on the sheet W that is also the name of the file to be written and stored into the non-contact tag 80 as tag data is input to the write text box 100. A word or a phrase relevant to content of the file to be printed; for example, "* * specification" or an index of LP1111, is input into the search word text box 102. Input operation is performed by operations of the operation section 6 of the multifunction apparatus 1 or operations of the PC, the PC transmits the file to the multifunction apparatus 1. In addition, the PC also transmits, at the same time, an address indicating where the file is stored on a network.

As shown in FIG. 5, in the control processing, the settings are read (step 200 hereinafter abbreviated as S200, and the same also applies to any counterparts in the following descriptions). In the reading of the settings, "1" is set on the page number iP; "1" is set on the number of pages to be printed "m"; and "Pend" is set on the number of file pages PP. Here, the term "Pend" indicates the total number of pages when the file is printed on the sheets W.

It is determined whether or not a search key word serving as search data is set (S205). When the search keyword is set (YES in S205), the sheet feeding cassette 9*a* holding the sheets W equipped with the non-contact tags 80*a* of a long communication range and small storage capacity is selected (S210). It is determined that whether or not the sheets W are held in the sheet feeding cassette 9*a* (S215). The determination as to whether or not the sheets W are held may be made by, for example, detecting whether or not the sheets W are held in the sheet feeding cassette 9*a* by a sheet detection sensor (not shown), or by ascertaining whether or not the non-contact tags 80*a* are detected by the IC reader 83. When the sheets W are not held in the sheet feeding cassette 9*a* (NO in S215), information indicating the deficiency of the sheets W is displayed on the display section 101 as an error report (S220), and the control processing finishes.

When the sheets W are determined to be held in the sheet feeding cassette 9*a* (YES in S215), conveyance of the sheets W equipped with the non-contact tags 80*a* of a long communication range and small storage capacity from the uppermost sheet feeding cassette 9*a* starts (S225).

The IC writer 81 writes (stores) the search keyword into the non-contact tag 81*a* of a long communication range and small storage capacity provided on the sheet W conveyed by the feed roller 25 (S230). The search keyword corresponds to words or phrases which have been input to the search keyword text box 102, and therefore, the capacity required for storing the search keyword is small.

Next, it is determined whether or not the writing operation is successful (S235). In the present embodiment, the IC writer 81 has a writing-and-reading function. After the IC writer 81 has written the search keyword into the non-contact tag 80*a* through the processing of S230, contents of the non-contact tag 80*a* are read, and the read contents are compared with the written contents, thereby determining whether or not the writing operation is successful. When the written contents are different from the read contents, the writing operation is determined to be unsuccessful (NO in S235). Then, information indicating that the writing operation is unsuccessful is displayed on the display section 101 as error report (S240). And, the sheet W is discharged to the sheet discharging tray 2*a* without being printed (S245), and the control processing finishes.

When the writing operation is determined to be successful (YES in S235), the conveyed sheet W is subjected to printing by the image forming unit 2 (S250). The printed sheet W is discharged to the sheet discharging tray 2*a* (S252). A value obtained by subtracting one from the number of file pages PP (hereinafter called "file pages") is substituted into PP, and "1" is added to the page number iP (S255).

After the processing of S255 finishes or when a search keyword is determined to be not set in the processing of S205 (NO in S205), it is determined whether or not a write file to be written into the non-contact tag 80 as a tag data is set (S260). The determination as to whether or not the write file is set is made by determining whether or not the file name is input in the write text box 100.

When the write file is set (YES in S260), "1" is set on a write flag WF (S265). When no write file is set (NO in S260), "0" is set on the write flag WF (S270).

After the write file is determined to be set (YES in S260) and after "1" is set on the write flag WF (S265), it is determined whether or not a data size CF of the write file as the tag data to be written into the non-contact tag 80 is smaller than a total amount (=CS·PP) of small storage capacities CS of the number of the non-contact tags 80*c* equal to the number of file pages PP of the sheets W to be printed (CF<CS·PP) (S275).

When the key word has been set, the file pages PP of the sheets W to be printed corresponds to a result of subtraction of one page from the total number of pages Pend in the processing of S255. A search keyword is written into the first page in the processing of S230, and therefore, the number of pages into which the write file is written becomes smaller by one page.

When the data size CF is smaller than the total amount (=CS·PP) of storage capacities of the non-contact tag 80*c* (YES in S275), writing of the tag data into the non-contact tag 80*c* of small storage capacity is determined to be possible. In this case, the sheet feeding cassette 9*c* holding the sheets W, each of which is equipped with the non-contact tag 80*c* of a short communication range and small storage capacity is selected (S280).

Specifically, since the data size CF of the write file is small, storing the write file into the non-contact tag 80*c* of small storage capacity CS in the number of the sheets W equal to the number of pages PP required for printing is determined to be possible. Then, the sheet feeding cassette 9*c* holding the non-contact tag 80*c* of a short communication range and small storage capacity is selected.

Next, the data size CF of the write file as the tag data is divided by the small capacity CS of the non-contact tag 80*c* in order to obtain the required number M of sheets W (S285). The required number M is an integer obtained by round-up operation. The required number M is the number of sheets W which are respectively equipped with the non-contact tags 80*c* required to write the write file.

When the data size CF is greater than the total amount (=CS·PP) of storage capacities of the number of the non-contact tag 80*c* in the processing of S275 (NO in S275), it is determined whether or not the data size CF of the tag data to be written into the non-contact tags 80 is smaller than the total amount (=CL·PP) of the number of the large storage capacities CL of the non-contact tags 80*b* equal to the number of file pages PP of the sheets W to be printed (CF<CL·PP) (S290).

When the data size CF is smaller than the total amount (=CL·PP) of storage capacities of the number of the non-contact tags 80*b* (YES in S290), storing the tag data into the large-capacity non-contact tags 80*b* is determined to be possible. Hence, the sheet feeding cassette 9*b* holding the sheets W equipped with the non-contact tags 80*b* of a short communication range and large storage capacity is selected (S295).

When the data size CF of the write file is large, blank sheets W are necessary to store the whole write file into the non-contact tags 80*c* of small storage capacities. However, when the write file is stored in the non-contact tags 80*b* of large storage capacity CL, storing the write file into the non-contact tags 80*b* of large storage capacity CL on the sheets W of the number PP required for printing is determined to be possible. Then, the sheet feeding cassette 9*b* holding the non-contact tags 80*b* of a short communication range and large storage capacity is selected.

The data size CF of the write tag data is divided by the large storage capacity CL of the non-contact tag 80*b* in order to obtain the required number M of sheets W (S300). In the case of the processing of S285, the required number M is an integer obtained by round-up operation. The required number M is the number of sheets W required to write the write file. The sheets are respectively equipped with the non-contact tags 80*b*.

After the required number M of sheets W equipped with the non-contact tags 80*c* of small storage capacity CS is obtained in the processing of S285 or after the required number M of sheets W equipped with the non-contact tags 80*b* of large storage capacity CL has been obtained; or after "0" has been set in the write flag WF when the write file is determined to be not set in the processing of S270, it is determined whether or not the page number iP has exceeded the total number of pages Pend (S305). Specifically, it is determined whether or not the sheets W have been printed up to the end page.

When the sheets W have not yet been printed up to the end page (NO in S305), it is determined whether or not the write flag WF is a value of one (S310) as shown in FIG. 7. When the write file is set and when the write flag WF is a value of one (YES in S310), it is determined whether or not the number of printed pages m printed since writing of the write file was started is equal to or less than the required number M of sheets W (S315).

When the number of printed pages m is smaller than the required number M of sheets W (YES in S315), the sheet feeding cassette 9*c* selected in the processing of S280 or the sheet feeding cassette 9*b* selected in the processing of S295 is continuously selected as a selected cassette (S320).

Next, as in the case of the processing of S215, it is determined whether or not the sheets Ware held in the selected sheet feeding cassettes 9*b* or 9*c* (S325). When the sheets W are determined to be not held in the selected sheet feeding cassettes 9*b* or 9*c* (NO in S325), an error report is issued (S330) as in the case of the processing of S220, and the control processing finishes.

When the sheets W are determined to be held in the selected sheet feeding cassettes 9*b* or 9*c* (YES in S325), conveyance of the sheets W equipped with the non-contact tags 80*b* of short communication range and large storage capacity or conveyance of the sheets W equipped with the non-contact tags 80*c* of short communication range and small storage capacity starts (S335).

Subsequently, the write file is written (stored) as tag data into the non-contact tags 80*b* of a short communication range and large storage capacity or the non-contact tags 80*c* of a short communication range and small storage capacity, which are provided on the sheets W to be conveyed by the feed roller 25, by the IC writer 81 (S340).

Next, as in the case of the processing of S235, it is determined whether or not the writing operation is successful (S345). When the writing operation is determined to be unsuccessful (NO in S345), an error report indicating unsuccessful writing is issued (S350). And, the sheet W is discharged to the sheet discharging tray 2*a* without being printed (S355), and the control processing finishes.

When the writing operation is determined to be successful (YES in S345), the conveyed sheet W is subjected to printing by the image forming unit 2 (S360). Then, the printed sheet W is discharged to the sheet discharging tray 2*a* (S365), and "1" is added to the number of printed pages m (S370). "1" is added to the page number iP (S375). Subsequently, the processing of S305 and subsequent steps is repeated and performing the processing of S310 and subsequent steps until the page number iP exceeds the total number of pages Pend.

For instance, when the sheet feeding cassette 9*c* holding the sheets W equipped with the non-contact tags 80*c* of a short communication range and small storage capacity is selected in the processing of S275 and S280, the write file as the tag data is written into the non-contact tags 80*c* of a short communication range and small storage capacity (S315 to S325 and S335 to S345). The sheets W equipped with the non-contact tags 80*c* of a short communication range and small storage capacity are subjected to printing (S360 and S365), "1" is respectively added to the number of printed pages m and the page number iP (S370 and S375).

On the other hand, when the sheet feeding cassette 9*b* holding the sheets W equipped with the non-contact tags 80*b* of a short communication range and large storage capacity is selected in the processings of S275, S290 and S295, the write file as the tag data is written into the non-contact tags 80*b* of a short communication range and large storage capacity (S315 to S325 and S335 to S345). The sheets W equipped with the non-contact tags 80*b* of a short communication range and large storage capacity are subjected to printing (S360 and S365), "1" is respectively added to the number of printed pages m and the page number iP (S370 and S375).

The tag data are written into the non-contact tags 80*c* of short communication range and small storage capacity or the non-contact tags 80*b* of short communication range and large storage capacity, by repetition of the processing of S305 and subsequent steps. When the number of printed pages m is determined to have exceeded the number of required sheets M in the processing of S315 (NO in S315), the sheet feeding cassette 9*d* holding the sheets W not having the non-contact tags 80 is selected (S380).

Specifically, when the number of printed pages m has become equal to or greater than the number of required sheets M, all of the write files are determined to have been written into the non-contact tags 80*c* of a short communication range and small storage capacity or the non-contact tags 80*b* of a short communication range and large storage capacity. In subsequent printing operation, the sheet feeding cassette 9*d* holding the sheets W not having the non-contact tags 80 is selected.

Next, as in the case of the processing of S215, it is determined whether or not the sheets W are held in the sheet feeding cassette 9*d* (S385). When the sheets W are determined to be not held in the sheet feeding cassette 9*d* (NO in S385), an error report is issued (S390) as in the case of the processing of S220, and the control processing finishes.

When the sheets W are determined to be held in the sheet feeding cassette 9*d* (YES in S385), conveyance of the sheet W not having the non-contact tag 80 from the sheet feeding cassette 9*d* starts (S395). The image forming unit 2 subjects the conveyed sheet W to printing (S400). The printed sheet W is discharged to the sheet discharging tray 2*a* (S405), and "1" is added to the page number iP (S410).

Specifically, after the writing file has been written (stored) as the tag data into the non-contact tag 80*c* or the non-contact tag 80*b*, the sheet W not having the non-contact tag 80 is subjected to printing when printing is further continued.

When the page number iP is determined to have exceeded to the total page numbers Pend as a result of repetition of the processings of S305 and subsequent steps, in the processing of S305 (YES in S305), all of the pages are determined to have been printed, and the control processing finishes.

As shown in FIG. 6, when the data size CF of the tag data to be written into the non-contact tags 80 is determined to be greater than the total amount (=CL·PP) of the number of the large storage capacities CL of the non-contact tags 80*b* equal to the number of file pages PP of the sheets W to be printed (CF<CL·PP) (YES in S290), it is determined whether or not the address on the network where the write file is set (S420).

When the data size CF is greater than the total amount (=CL·PP) of storage capacities of the non-contact tags 80*b*, that is the data size of the tag data to be written is greater, blank sheets W are necessary to store the whole tag data into the non-contact tags 80. In this case, it is determined whether or not the address is set. Here, the term, address, means one by which an access is made to the write file in a server, an external storage system, or the like, connected to a network by a wired LAN, a wireless LAN, or the like. The address is transmitted to the multifunction apparatus 1 along with an input from the operation section 6 of the multifunction apparatus 1 or the write file from the PC. When no address is set (NO in S420), information indicating that no address is set is displayed on the display section 101 as an error report (S425). Then, the control processing finishes.

When an address is set (YES in S420), the sheet feeding cassette 9*c* holding the sheets W of short communication range and small storage capacity (S430) is selected. Next, as in the case of the processing of S215, it is determined whether or not the sheets W are held in the sheet feeding cassette 9*c* (S435). When the sheets W are determined to be not held in the sheet feeding cassette 9*c* (NO in S435), an error report is issued (S440) as in the case of the processing of S220, and the control processing finishes.

When the sheets W are determined to be held in the sheet feeding cassette 9*c* (YES in S435), conveyance of the sheet W equipped with the non-contact tag 80*c* of a short communication range and small storage capacity from the sheet feeding cassette 9*c* starts (S445). Subsequently, the address is written by the IC writer 81 as the tag data into the non-contact tag 80*c* of a short communication range and short storage capacity on the sheet W conveyed by the feed roller 25 (S450).

Next, as in the case of the processing of S235, it is determined whether or not the writing operation is successful (S455). When the writing operation is determined to be unsuccessful (NO in S455), an error report indicating unsuccessful writing is issued (S460). And, the sheet W is discharged to the sheet discharging tray 2*a* without being printed (S465), and the control processing finishes.

When the writing operation is determined to be successful (YES in S455), the conveyed sheet W is subjected to printing by the image forming unit 2 (S470). Next, the printed sheet W is discharged to the sheet discharging tray 2*a* (S475), "0" is set on the write flag WF (S480), and "1" is added to the page number iP (S485).

Subsequently, the processing of S305 and subsequent steps are repeated. When the page number iP remains unexceeded the total number of pages Pend through repetition of processing pertaining to S305 and the subsequent steps (NO in S305), a numeral of 0 is determined to be set on the write flag WF in the processing of S310 (NO in S310). Then, the sheet feeding cassette 9*d* holding the sheets W not having the non-contact tags 80 is selected (S490).

Next, as in the case of the processing of S215 (where detection performed by the IC reader 83 is disabled), it is determined whether or not the sheets W are held in the sheet feeding cassette 9*d* (S495). When the sheets W are determined to be not held in the sheet feeding cassette 9*d* (NO in S495), an error report (S500) is issued as in the case of the processing of S220, and the control processing finishes.

When the sheets W are determined to be held in the sheet feeding cassette 9*d* (YES in S495), conveyance of the sheet W not having the non-contact tags 80 starts (S505). The conveyed sheet W is subjected to printing by the image forming unit 2 (S510). Next, the printed sheet W is discharged to the sheet discharging tray 2*a*, and "1" is added to the page number Pi (S520).

When the data size CF is greater than the total amount (=CL·PP) of storage capacities of the non-contact tags 80*b*, the address is written (stored) into the non-contact tag 80*c* as the tag data without writing the write file into the non-contact tag 80. Subsequently, when printing is continued, the sheet W not having the non-contact tag 80 is subjected to printing. By writing the address into the non-contact tag 80*c* of small storage capacity, the write file can be acquired in accordance with the address, and writing of the write file into non-contact tag 80 of blank sheets can be prevented.

When it is determined that the page number iP has exceeded the total number of pages Pend by repetition of the processing of S305 and subsequent steps in the processing of S305 (YES in S305), all of the pages are determined to have been printed, and the control processing finishes.

When no write file is determined to be set in the processing of S260 (NO in S260) and when a value of 0 is set in the write flag WF in the processing of S270, a numeral of 0 is determined to be set in the write flag WF in the processing of S310 (NO in S310), and the sheet feeding cassette 9*d* holding the sheets W not having the non-contact tags 80 is selected (S490).

As in the case of the processing of S215, it is determined whether or not the sheets W are held in the sheet feeding cassette 9*d* (S495). When the sheets W are determined to be not held in the sheet feeding cassette 9*d* (NO in S495), an error report is issued as in the case of the processing of S220 (S500), and the control processing finishes.

In contrast, when the sheets W are determined to be held in the sheet feeding cassette 9*d* (YES in S495), conveyance of the sheet W not having the non-contact tag 80 from the sheet feeding cassette 9*d* starts (S505), and the image forming unit 2 subjects the sheet W to printing (S510). The printed sheet W is discharged to the sheet discharging tray 2*a* (S515), and "1" is added to the page number iP (S520).

Specifically, the search keyword is written into the first page. However, when there is no write file, the sheets W not having the non-contact tag 80 are used for printing the second page and subsequent pages when no write file is set or for printing operation performed when neither the search keyword nor the write file are set.

In the present embodiment, when a search keyword is set as the search data, the sheet feeding cassette 9*a* holding the sheets W having the non-contact tags 80*a* of a long communication range and small storage capacity is selected. The present embodiment is not limited to this case. When a large volume of data, such as graphics data, is set as the tag data, the sheet feeding cassette 9*b* holding the sheets W having the non-contact tags 8*b* of large storage capacity may also be selected. In this case, contents of the write file (tag data) maybe determined by an extension of the write file.

When the data size of the write file is large and when an address is written into the non-contact tag 80*c* of small storage capacity, the sheet W equipped with a non-contact tag of large storage capacity may be used for the end page that serves as a back cover, and the write file of large volume may be written into the non-contact tag of large storage capacity.

As mentioned above, the present invention is not limited to such embodiments and can be implemented in various modes within the scope of the gist of the invention.

The present invention provides illustrative, non-limiting embodiments as follows:

An image forming apparatus includes: a image forming section that forms an image based on a print data on at least one sheet equipped with a non-contact tag; a writing section that wirelessly writes a tag data into the non-contact tag of the at least one sheet; a first cassette that holds a plurality of sheets equipped with first type non-contact tags having a first storage capacity; a second cassette that holds a plurality of sheets equipped with second type non-contact tags having a second storage capacity larger than the first storage capacity; and a selecting section that selects a print cassette from among the first and second cassettes based on a data size of the tag data. The at least one sheet on which the image is formed by the image forming section is provided from the print cassette.

The selecting section may select the print cassette based on the data size of the tag data and a total amount of storage capacities of non-contact tags of a number of sheets required for forming the image based on the print data.

The selecting section may select the second cassette as the print cassette when the data size of the tag data is greater than the total amount of storage capacities of the first type non-contact tags of a number of sheets held in the first cassette required for forming the image based on the print data.

The first type non-contact tags of the sheets held in the first cassette may have a first communication range. The second type non-contact tags of the sheets held in the second cassette may have a second communication range shorter than the first communication range. The selecting section may select the first cassette as the print cassette for a first sheet of the at least one sheet on which the image is formed by the image forming section when the tag data includes a search data. The writing section writes the search data into the first type non-contact tag of the first sheet.

The search data may include a file name of the print data.

The search data may include a word or a phrase relevant to a content of the print data.

The selecting section may select the second cassette for a subsequent sheet of the at least one sheet on which the image is formed by the image forming section when a total amount of storage capacities of the first type non-contact tags of a number of sheets required for forming the image based on the print data.

The image forming apparatus may further include a third cassette that holds a plurality of sheets not equipped with a non-contact tag. When the writing section finishes writing the tag data into the non-contact tags before the image forming section finishes forming the images, the selecting section may select the third cassette for remaining sheets of the at least one sheet on which the image is formed by the image forming section.

The selecting section may select the first cassette as the print cassette when the data size of the tag data is greater than a total amount of storage capacities of the second type non-contact tags of the number of sheets required for forming the image based on the print data. The writing section may write an address indicating where the tag data is stored on a network.

The image forming apparatus may further include a plurality of tag detectors that are provided for respective cassettes and detect types of the non-contact tags.

The tag data include the print data.

According to the above configuration, the image forming apparatus may select a cassette holding sheets in accordance with the amount of tag data to be stored in a non-contact tag and a total amount of storage capacities of non-contact tags equal to the number of sheets to be printed. Accordingly an increase in the number of sheets, which would otherwise be caused by storing tag data into non-contact tags of blank sheets may be prevented. A tag of large storage capacity is usually greater than a tag of small storage capacity in terms of the area of a chip, which in turn results in an increase in the potential risk of damage being inflicted by a bend of a sheet, or the like. Therefore, use of a non-contact tag of smallest capacity may be desirable. According to the above configuration, use of a tag of large storage capacity may be suppressed to the minimum required level, and hence the potential risk of breakage, such as that mentioned above, may be decreased, and a cost advantage may be achieved.

When the amount of tag data to be stored exceeds the total of small capacities of non-contact tags equal to the number of sheets, a cassette holding sheets equipped with non-contact tags of large storage capacity is selected, thereby preventing outputting of blank sheets, which would otherwise be caused by storing tag data into non-contact tags of small storage capacity.

When tag data include a search data, a cassette holding sheets equipped with non-contact tags of a long communication range and small storage capacity is selected as the first cassette, location of a sheet may be performed from a long distance. Accordingly, location of a sheet may be facilitated. At that time, when the amount of the tag data to be stored exceeds a total amount of small storage capacities of non-contact tags equal to the number of sheets to be printed, a cassette holding sheets equipped with non-contact tags of a short communication range and large storage capacity is selected, whereupon storage of the tag data into a non-contact tag of small storage capacity and prevention of outputting of blank sheets may be performed. Thus, outputting of a blank sheet may be prevented.

Moreover, the image forming apparatus may include a cassette holding sheets not having the non-contact tags. After storage of the tag data, sheets not having a non-contact tag are subjected to printing, whereupon the number of sheets equipped with non-contact tags may be reduced.

When the amount of tag data is large, an address on the network is stored as tag data in the non-contact tag. As a result, the tag data may be acquired from the network without storing tag data into a non-contact tag of a blank sheet.

Detectors for determining the type of a non-contact tag may be respectively provided for the plurality of cassettes. As a result, even when non-contact tags of different types are held in respective cassettes, storing tag data into an erroneous non-contact tag and subjecting an erroneous sheet to printing may be prevented.

What is claimed is:

1. An image forming apparatus comprising:

an image forming section that forms an image based on a print data on at least one sheet equipped with a non-contact tag;

a writer that wirelessly writes a tag data into the non-contact tag of the at least one sheet;

a first cassette that holds a plurality of sheets equipped with first type non-contact tags having a first storage capacity;

a second cassette that holds a plurality of sheets equipped with second type non-contact tags having a second storage capacity larger than the first storage capacity; and a selecting section that selects a print cassette from among the first and second cassettes based on a data size of the tag data, wherein the at least one sheet on which the image is formed by the image forming section is provided from the print cassette.

2. The image forming apparatus according to claim 1, wherein the selecting section selects the print cassette based on the data size of the tag data and a total amount of storage capacities of non-contact tags of a number of sheets required for forming the image based on the print data.

3. The image forming apparatus according to claim 2, wherein the selecting section selects the second cassette as the print cassette when the data size of the tag data is greater than the total amount of storage capacities of the first type non-contact tags of a number of sheets held in the first cassette required for forming the image based on the print data.

4. The image forming apparatus according to claim 1, wherein the first type non-contact tags of the sheets held in the first cassette have a first communication range, wherein the second type non-contact tags of the sheets held in the second cassette have a second communication range shorter than the first communication range, wherein the selecting section selects the first cassette as the print cassette to provide a first sheet of the at least one sheet on which the image is formed by the image forming section when the tag data includes a search data, and wherein the writer writes the search data into the first type non-contact tag of the first sheet.

5. The image forming apparatus according to claim 4, wherein the search data includes a file name of the print data.

6. The image forming apparatus according to claim 4, wherein the search data includes a word or a phrase relevant to a content of the print data.

7. The image forming apparatus according to claim 4, wherein the selecting section selects the second cassette for a subsequent sheet of the at least one sheet on which the image is formed by the image forming section when the data size of the tag data is greater than a total amount of storage capacities of the first type non-contact tags of a number of sheets required for forming the image based on the print data.

8. The image forming apparatus according to claim 1, further comprising a third cassette that holds a plurality of sheets not equipped with a non-contact tag, wherein when the writer finishes writing the tag data into the non-contact tags before the image forming section finishes forming the images, the selecting section selects the third cassette for remaining sheets of the at least one sheet on which the image is formed by the image forming section.

9. The image forming apparatus according to claim 1, wherein the selecting section selects the first cassette as the print cassette when the data size of the tag data is greater than a total amount of storage capacities of the second type non-contact tags of the number of sheets required for forming the image based on the print data, and wherein the writer writes an address indicating where the tag data is stored on a network.

10. The image forming apparatus according to claim 1, further comprising a plurality of tag detectors that are provided for respective cassettes and detect types of the non-contact tags.

11. The image forming apparatus according to claim 1, wherein the tag data includes the print data.

* * * * *